(12) United States Patent
Yang et al.

(10) Patent No.: US 12,727,031 B2
(45) Date of Patent: Sep. 1, 2026

(54) METHOD, DEVICE, STORAGE MEDIUM, AND PROGRAM PRODUCT FOR COMMUNICATION

(71) Applicant: Huawei Technologies Co., Ltd., Shenzhen (CN)

(72) Inventors: Mao Yang, Xi'an (CN); Zhongjiang Yan, Xi'an (CN); Yunbo Li, Shenzhen (CN); Ming Gan, Shenzhen (CN); Yuchen Guo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 309 days.

(21) Appl. No.: 18/430,990

(22) Filed: Feb. 2, 2024

(65) Prior Publication Data

US 2024/0179740 A1 May 30, 2024

Related U.S. Application Data

(63) Continuation of application No. PCT/CN2022/109546, filed on Aug. 1, 2022.

(30) Foreign Application Priority Data

Aug. 3, 2021 (CN) ......................... 202110886958.5

(51) Int. Cl.

*H04W 74/0816* (2024.01)
*H04L 61/50* (2022.01)
*H04W 74/08* (2009.01)
*H04L 101/622* (2022.01)
*H04W 84/12* (2009.01)

(52) U.S. Cl.

CPC ......... *H04W 74/0816* (2013.01); *H04L 61/50* (2022.05); *H04W 74/0866* (2013.01); *H04L 2101/622* (2022.05); *H04W 84/12* (2013.01)

(58) Field of Classification Search

CPC ......... H04W 74/0816; H04W 74/0866; H04W 84/12; H04L 61/50; H04L 2101/622

See application file for complete search history.

(56) References Cited

U.S. PATENT DOCUMENTS

2015/0063251 A1* 3/2015 Asterjadhi ............ H04W 74/04 370/329
2017/0118725 A1* 4/2017 Chu .................. H04W 72/0473
2021/0329642 A1* 10/2021 Chen ..................... H04W 72/21

OTHER PUBLICATIONS 802.11-2016, Part 11: Wireless LAN Medium Access Control (MAC) and Physical Layer (PHY) Specifications, Dec. 7, 2016, total 3534 pages.

(Continued)

*Primary Examiner* — Samina F Choudhry
(74) *Attorney, Agent, or Firm* — Conley Rose, P.C.

(57) ABSTRACT

A method includes an access point device that obtains a transmission opportunity (TXOP) in a wireless local area network (WLAN) and that allocates a first period in the TXOP to a non-access point device for data transmission. The access point device receives a first frame in the first period. An access address or a transmitter address of the first frame is associated with the non-access point device. The method further includes that the access point device keeps, based on the first frame, a network allocation vector (NAV) unchanged.

20 Claims, 6 Drawing Sheets

(56) References Cited

OTHER PUBLICATIONS

IEEE P802.11be™/D0.01, Part 11: Wireless LAN Medium Access Control (MAC) and Physical Layer (PHY) Specifications, Amendment 7: Enhancements for extremely high throughput (EHT), Jul. 2020, total 33 pages.

IEEE P802.11ax™/D8.0, Oct. 2020, Part 11: Wireless LAN Medium Access Control (MAC) and Physical Layer (PHY) Specifications, Amendment 1: Enhancements for High Efficiency WLAN, total 820 pages.

* cited by examiner

400

410

Allocate a first period in an obtained transmission opportunity to a non-access point device for data transmission

420

Receive a first frame in the first period

430

Whether pre-determined conditions are met

Yes

440

Update a network allocation vector

METHOD, DEVICE, STORAGE MEDIUM, AND PROGRAM PRODUCT FOR COMMUNICATION

CROSS-REFERENCE TO RELATED APPLICATIONS

This is a continuation of International Patent Application No. PCT/CN2022/109546 filed on Aug. 1, 2022, which claims priority to Chinese Patent Application No. 202110886958.5 filed on Aug. 3, 2021. The disclosures of the aforementioned applications are hereby incorporated by reference in their entireties.

TECHNICAL FIELD

Embodiments of the present disclosure mainly relate to the communication field, and in particular, to a method, a device, a storage medium, and a program product for setting a network allocation vector (NAV).

BACKGROUND

A wireless local area network (WLAN) technology has evolved from 802.11a/g, 802.11n, 802.11ac, and 802.11ax standards to today's 802.11be standard and has undergone several generations of evolution. Accordingly, a data throughput increases continuously. Therefore, the 802.11ax standard is also referred to as a (High-Efficiency Wireless, and the 802.11be standard may also be referred to as an Extremely High Throughput (EHT). A WLAN system is usually deployed on an unlicensed spectrum. Therefore, a plurality of station devices in a network may use channel resources through contention.

In a common enhanced distributed channel access (EDCA) contention mechanism, before sending data, a station needs to first sense whether another station is sending data. If a channel is busy in a sensing result, sending of the station is suspended temporarily until the channel becomes idle. After the channel becomes idle, channel backoff further needs to be performed before data is sent, to cope with collisions between a plurality of potential sending stations. After completing the channel backoff, the station may perform data transmission. Before actually sending data, the station may further perform interaction of a short-control frame with another station in a network, for example, request to send (RTS)/clear to send (CTS). If the interaction of the short-control frame succeeds, it means that channel contention succeeds, and then the station may reserve a time period for data transmission. This time period is referred to as a transmission opportunity (TXOP). The station that successfully reserves the TXOP is referred to as a TXOP holder. In the TXOP, only the TXOP holder is allowed to actively send data, and another station can only receive data or send a corresponding response frame. If a collision occurs during the interaction of the short-control frame, the station may avoid subsequent transmission of a long data frame, and perform channel backoff again. In this way, a transmission failure of an entire data frame may be avoided, thereby further reducing a throughput loss caused by the collision.

SUMMARY

In general, embodiments of the present disclosure provide a method, a device, and a computer-readable storage medium for communication.

In a first aspect of the present disclosure, a communication method is provided. The method includes an access point device that obtains a TXOP in a WLAN allocates a first period in the TXOP to a non-access point device for data transmission, the access point device receives a first frame in the first period, where an access address or a transmitter address of the first frame is associated with the non-access point device, and the access point device keeps, based on the first frame, a NAV unchanged.

In a first implementation of the first aspect, the access point device maintains a single NAV including the NAV.

In a second implementation of the first aspect, the access address or the transmitter address of the first frame is a media access control (MAC) address of the non-access point device.

In a third implementation of the first aspect, the access point device allocates the first period to the non-access point device by using a multi-user RTS (MU-RTS) TXOP sharing (TXS) trigger frame (TF).

In a fourth implementation of the first aspect, the method further includes the following. Before sending data, the access point device sends an RTS frame to at least one receiving device, the access point device receives a CTS frame from the at least one receiving device, and the access point device sends the data to the at least one receiving device.

In a fifth implementation of the first aspect, the access point device maintains two NAVs including the NAV. The NAV is an intra-basic service set (intra-BSS) NAV. In addition, in the method, the access point device updates the intra-BSS NAV based on conditions being met. The conditions include the following. The first frame is an intra-BSS frame, first duration that is used for data transmission and that is included in the first frame is greater than second duration indicated by an intra-BSS NAV currently maintained by the access point device, a receiver address of the first frame is not a MAC address of the access point device, and the access address or the transmitter address of the first frame is not associated with the non-access point device.

In a sixth implementation of the first aspect, the access point device maintains two NAVs including the NAV, and the NAV is a basic NAV. In addition, in the method, the access point device updates the basic NAV based on conditions being met. The conditions include the following. The first frame is an inter-basic service set (inter-BSS) frame, or the first frame is not identified by any one of an inter-BSS or an intra-BSS, first duration that is used for data transmission and that is included in the first frame is greater than second duration indicated by a basic NAV currently maintained by the access point device, a receiver address of the first frame is not a MAC address of the access point device, and the access address or the transmitter address of the first frame is not associated with the non-access point device.

In a seventh implementation of the first aspect, that the access point device keeps a NAV unchanged further includes the following. The access point device determines received energy of a physical layer protocol data unit (PPDU) used to carry the first frame, and the access point device, based on the received energy not exceeding a pre-determined energy threshold, keeps the NAV unchanged.

In an eighth implementation of the first aspect, the access point device is an EHT access point.

According to the communication solution of the present disclosure, an access point (AP) serving as a TXOP holder may conditionally not update the NAV. In other words, when pre-determined conditions are met, the AP may not update the NAV maintained by the AP in an allocation period or a remaining time of the TXOP shared with another non-AP station based on a duration field in a received radio frame. Therefore, the following problem may be avoided or reduced: the TXOP holder cannot send data in the TXOP period because the NAV is not equal to 0. Based on such a manner, the technical solution of the present disclosure can fully utilize a spectrum resource of a communication system, improve resource efficiency, and ensure system performance and communication quality.

In a second aspect of the present disclosure, a communication method is provided. The method includes an access point device that obtains a TXOP in a WLAN allocates a first period in the TXOP to a non-access point device for data transmission, the access point device receives a first frame in the first period, and the access point device updates a NAV if conditions are met. The conditions include the following. First duration that is used for data transmission and that is included in the first frame is greater than second duration indicated by a NAV currently maintained by the access point device, a receiver address of the first frame is not a MAC address of the access point device, and an access address or a transmitter address of the first frame is not associated with the non-access point device.

In a first implementation of the second aspect, the NAV is at least one of an intra-BSS NAV and a basic NAV.

In a second implementation of the second aspect, the conditions further include that the first frame is an intra-BSS frame, and that the access point device updates a NAV includes that the access point device updates an intra-BSS NAV.

In a third implementation of the second aspect, the conditions further include that the first frame is an inter-BSS frame, or the first frame is not identified by any one of an inter-BSS or an intra-BSS, and that the access point device updates a NAV includes that the access point device updates a basic NAV.

In a fourth implementation of the second aspect, the access point device maintains a single NAV including the NAV.

In a fifth implementation of the second aspect, the method further includes the following. Before sending data, the access point device sends an RTS frame to at least one receiving device, the access point device receives a CTS frame from the at least one receiving device, and the access point device sends the data to the at least one receiving device.

According to the communication solution of the present disclosure, a triggered TXOP sharing mechanism is improved, so that the following case may be avoided or reduced: an access node cannot perform data transmission within a remaining time of the TXOP due to an update of the NAV. In this way, resource efficiency of a communication network is improved, and system performance and communication quality are ensured.

In a third aspect of the present disclosure, a communication method is provided. The method includes the following. An access point device that obtains a TXOP in a WLAN allocates a first period in the TXOP to a non-access point device for data transmission, the access point device receives a first frame in the first period, the access point device updates a maintained NAV based on the first frame, and if an access address or a transmitter address of the first frame is associated with the non-access point device, and a value of a TXNAV timer is not equal to 0, the access point device determines, based on virtual carrier sense, that a channel is idle.

In a first implementation of the third aspect, the access point device maintains a single NAV including the NAV.

In a second implementation of the third aspect, the access point device maintains two NAVs including the NAV. The NAV is an intra-BSS NAV. In addition, that the access point device, based on virtual carrier sense, determines that a channel is idle includes the following. If a value of a basic NAV in the two NAVs is equal to 0, the access point device determines, based on virtual carrier sense, that the channel is idle.

In a third implementation of the third aspect, the access point device maintains two NAVs including the NAV, and the NAV is a basic NAV. In addition, that the access point device, based on virtual carrier sense, determines that a channel is idle includes the following. If a value of an intra-BSS NAV in the two NAVs is equal to 0, the access point device, based on virtual carrier sense, determines that the channel is idle.

In a fourth implementation of the third aspect, the access point device allocates the first period to the non-access point device by using an MU-RTS TXS TF.

In a fifth implementation of the third aspect, in the method, before sending data, the access point device sends an RTS frame to at least one receiving device, the access point device receives a CTS frame from the at least one receiving device, and the access point device sends the data to the at least one receiving device.

In a sixth implementation of the third aspect, in the method, the access point device is an EHT access point.

According to the communication solution of the present disclosure, an AP serving as a TXOP holder may conditionally ignore an update to the NAV. Further, when predetermined conditions are met, the AP can continue to perform data transmission when the NAV is updated in an allocation period or a TXOP period shared with another non-AP station. Therefore, the following problem may be avoided or reduced: the TXOP holder cannot send data in the TXOP period because the NAV is not equal to 0. Based on such a manner, the technical solution of the present disclosure can fully utilize a spectrum resource of a communication system, improve resource efficiency, and ensure system performance and communication quality.

In a fourth aspect of the present disclosure, a communication device is provided. The communication device includes at least one processor, and at least one memory including computer program code. The at least one memory and the computer program code are configured to work with the at least one processor to enable the communication device to implement the following steps. An access point device that obtains a TXOP in a WLAN allocates a first period in the TXOP to a non-access point device for data transmission, the access point device receives a first frame in the first period, where an access address or a transmitter address of the first frame is associated with the non-access point device, and the access point device keeps, based on the first frame, a NAV unchanged.

In a fifth aspect of the present disclosure, a communication device is provided. The communication device includes at least one processor and at least one memory including computer program code. The at least one memory and the computer program code are configured to work with the at least one processor to enable the communication device to implement the following steps. An access point device that obtains a TXOP in a WLAN allocates a first period in the TXOP to a non-access point device for data transmission, the access point device receives a first frame in the first period, and the access point device updates a NAV if conditions are met. The conditions include the following. First duration that is used for data transmission and that is included in the first frame is greater than second duration indicated by a NAV currently maintained by the access point device, a receiver address of the first frame is a MAC address of the access point device, and an access address or a transmitter address of the first frame is associated with the non-access point device.

In a sixth aspect of the present disclosure, the communication device includes at least one processor and at least one memory including computer program code. The at least one memory and the computer program code are configured to work with the at least one processor to enable the communication device to implement the following steps. An access point device that obtains a TXOP in a WLAN allocates a first period in the TXOP to a non-access point device for data transmission, the access point device receives a first frame in the first period, the access point device updates a maintained NAV based on the first frame, and if an access address or a transmitter address of the first frame is associated with the non-access point device, and a TXNAV is not equal to 0, the access point device determines, based on virtual carrier sense, that a channel is idle.

In a seventh aspect of the present disclosure, a communication device is provided. The communication device includes a component configured to allocate a first period in an obtained TXOP to a non-access point device for data transmission, a component configured to receive a first frame in the first period, where an access address or a transmitter address of the first frame is associated with the non-access point device, and a component configured to keep, based on the first frame, a NAV unchanged.

In an eighth aspect of the present disclosure, a communication device is provided. The communication device includes a component configured to allocate a first period in an obtained TXOP to a non-access point device for data transmission, a component configured to receive a first frame in the first period, and a component configured to update a NAV if conditions are met. The conditions include the following. First duration that is used for data transmission and that is included in the first frame is greater than second duration indicated by a NAV currently maintained by the access point device, a receiver address of the first frame is a MAC address of the access point device, and an access address or a transmitter address of the first frame is associated with a non-access point device.

In a ninth aspect of the present disclosure, a communication device is provided. The communication device includes a component configured to allocate a first period in an obtained TXOP to a non-access point device for data transmission, a component configured to receive a first frame in the first period, a component configured to update a maintained NAV based on the first frame, and a component configured to determine, based on virtual carrier sense, that a channel is idle if an access address or a transmitter address of the first frame is associated with the non-access point device and a TXNAV is not equal to 0.

In a tenth aspect of the present disclosure, a communication device is provided. The communication device includes an allocating unit configured to allocate a first period in an obtained TXOP to a non-access point device for data transmission, a receiving unit, which is a component configured to receive a first frame in the first period, where an access address or a transmitter address of the first frame is associated with the non-access point device, and an updating unit configured to keep, based on the first frame, a NAV unchanged.

In an eleventh aspect of the present disclosure, a communication device is provided. The communication device includes an allocating unit configured to allocate a first period in an obtained TXOP to a non-access point device for data transmission, a receiving unit, which is a component configured to receive a first frame in the first period, and an updating unit, which is a component configured to update a NAV if conditions are met. The conditions include the following. First duration that is used for data transmission and that is included in the first frame is greater than second duration indicated by a NAV currently maintained by the access point device, a receiver address of the first frame is a MAC address of the access point device, and an access address or a transmitter address of the first frame is associated with the non-access point device.

In a twelfth aspect of the present disclosure, a communication device is provided. The communication device includes an allocating unit configured to allocate a first period in an obtained TXOP to a non-access point device for data transmission, a receiving unit configured to receive a first frame in the first period, an updating unit configured to update a maintained NAV based on the first frame, and a determining unit configured to determine, based on virtual carrier sense, that a channel is idle if an access address or a transmitter address of the first frame is associated with the non-access point device and a TXNAV is not equal to 0.

According to a thirteenth aspect of the present disclosure, a computer-readable storage medium is provided. The computer-readable storage medium stores a computer program. When the program is executed by a processor, the following steps are implemented: allocating a first period in an obtained TXOP to a non-access point device for data transmission, receiving a first frame in the first period, where an access address or a transmitter address of the first frame is associated with the non-access point device, and keeping, based on the first frame, a NAV unchanged.

According to a fourteenth aspect of the present disclosure, a computer-readable storage medium is provided. The computer-readable storage medium stores a computer program. When the program is executed by a processor, the following steps are implemented: allocating a first period in an obtained TXOP to a non-access point device for data transmission, receiving a first frame in the first period, and updating, by an access point device, a NAV if conditions are met. The conditions include the following. First duration that is used for data transmission and that is included in the first frame is greater than second duration indicated by a NAV currently maintained by the access point device, a receiver address of the first frame is a MAC address of the access point device, and an access address or a transmitter address of the first frame is associated with the non-access point device.

According to a fifteenth aspect of the present disclosure, a computer-readable storage medium is provided. The computer-readable storage medium stores a computer program. When the program is executed by a processor, the following steps are implemented: allocating a first period in an obtained TXOP to a non-access point device for data transmission, receiving, by an access point device, a first frame in the first period, updating, by the access point device, a maintained NAV based on the first frame, and determining, by the access point device based on virtual carrier sense, that a channel is idle if an access address or a transmitter address of the first frame is associated with the non-access point device and a TXNAV is not equal to 0.

According to a sixteenth aspect of the present disclosure, a computer program product is provided. The computer program product includes computer executable instructions. When the computer executable instructions are executed by a processor, a method is implemented. The method includes: allocating a first period in an obtained TXOP to a non-access point device for data transmission, receiving a first frame in the first period, where an access address or a transmitter address of the first frame is associated with the non-access point device, and keeping, based on the first frame, a NAV unchanged.

According to a seventeenth aspect of the present disclosure, a computer program product is provided. The computer program product includes computer executable instructions. When the computer executable instructions are executed by a processor, a method is implemented. The method includes allocating a first period in an obtained TXOP to a non-access point device for data transmission, receiving a first frame in the first period, and updating, by an access point device, a NAV if conditions are met. The conditions include the following. First duration that is used for data transmission and that is included in the first frame is greater than second duration indicated by a NAV currently maintained by the access point device, a receiver address of the first frame is a MAC address of the access point device, and an access address or a transmitter address of the first frame is associated with a non-access point device.

According to an eighteenth aspect of the present disclosure, a computer program product is provided. The computer program product includes computer executable instructions. When the computer executable instructions are executed by a processor, a method is implemented. The method includes allocating a first period in an obtained TXOP to a non-access point device for data transmission, receiving, by an access point device, a first frame in the first period, updating, by the access point device, a maintained NAV based on the first frame, and determining, by the access point device based on virtual carrier sense, that a channel is idle if an access address or a transmitter address of the first frame is associated with the non-access point device and a TXNAV is not equal to 0.

The concepts described in this section will be further described in the following specific implementations.

BRIEF DESCRIPTION OF DRAWINGS

The foregoing and other features, advantages, and aspects of embodiments of the present disclosure become more obvious with reference to the accompanying drawings and the following detailed descriptions. In the accompanying drawings, same or similar reference numerals represent same or similar elements.

In each accompanying drawing, the same or similar reference numerals represent the same or similar elements.

DESCRIPTION OF EMBODIMENTS

Figure 1:
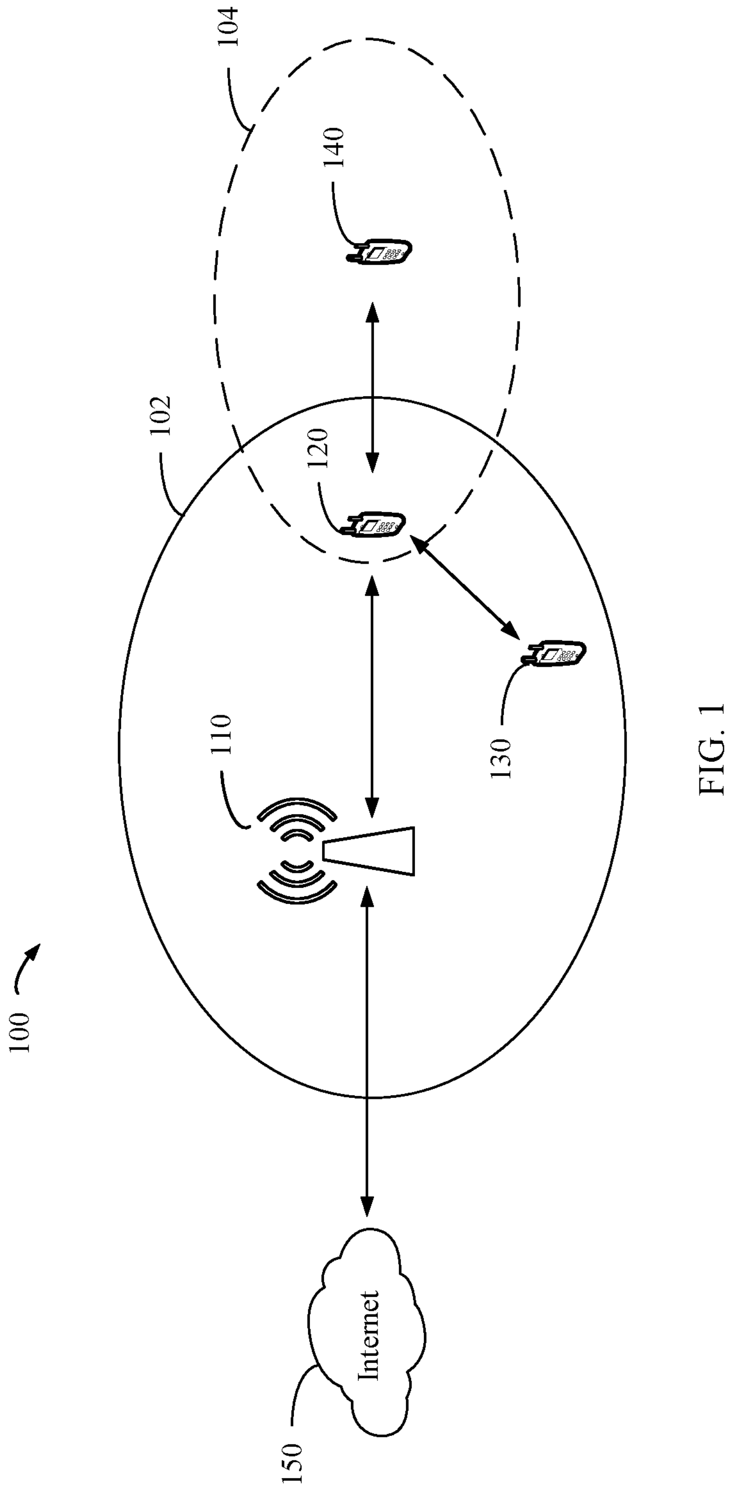
FIG. 1 is a schematic diagram of a communication environment in which embodiments of the present disclosure may be implemented.

The following describes embodiments of the present disclosure in detail with reference to the accompanying drawings. Although some embodiments of the present disclosure are shown in the accompanying drawings, it should be understood that the present disclosure may be implemented in various forms, and should not be construed as being limited to the embodiments described herein. On the contrary, these embodiments are provided so that the present disclosure will be thoroughly and completely understood. It should be understood that the accompanying drawings and embodiments of the present disclosure are merely used as examples, but are not intended to limit the protection scope of the present disclosure.

Technical solutions in embodiments of this disclosure may be applied to a WLAN system, or may be applied to a communication system of another standard, for example, may be a Long-Term Evolution (LTE) system, a fifth generation (5G) system, or another communication system in the future. A WLAN system is used as an example. An access point (AP) and a station (STA) are basic composition devices of the WLAN system. The AP is an access point used by a mobile user to access a wired network, and is mainly deployed at a home, within a building, and in a campus, and a typical coverage radius is tens of meters to hundreds of meters. Certainly, the AP may also be deployed outdoors. The AP is equivalent to a bridge that connects a wired network and a wireless network. A main function of the AP is to connect wireless network clients together, and then to access the wireless network to an Ethernet. Further, the AP may be a device with a WI-FI chip, for example, a terminal device or a network device with a WI-FI chip. Optionally, the AP may be a device that supports an 802.11ax standard. Optionally, the AP may also be a device that supports a plurality of WLAN standards such as 802.11ac, 802.11n, 802.11g, 802.11b, and 802.11a. Further, the AP may also be a device that supports WLAN standards including the 802.11be standard and another 802.11 standard in the future. A type of the standard supported by the AP is not limited in embodiments of this disclosure.

The STA may also be referred to as a non-AP device, and is usually a terminal device in the WLAN system. The STA may be movable or may be fixed, and is the most basic composition device of the WLAN. The STA may be a wireless communication chip, a wireless sensor, or a wireless communication terminal, such as a mobile phone supporting a WI-FI communication function, a tablet computer supporting a WI-FI communication function, a set-top box supporting a WI-FI communication function, a smart television supporting a WI-FI communication function, a smart wearable device supporting a WI-FI communication function, an in-vehicle communication device supporting a WI-FI communication function, or a computer supporting a WI-FI communication function. Similarly, the STA may be a device that supports the 802.11ax standard, or the STA may be a device that supports a plurality of WLAN standards such as 802.11ac, 802.11n, 802.11g, 802.11b, and 802.11a.

Further, the STA may also be a device that supports WLAN standards including the 802.11be standard and another 802.11 standard in the future. A type of the standard supported by the STA is not limited in embodiments of this disclosure.

The term "include" and similar terms used in this specification should be understood as open inclusion, that is, "include but is not limited to". Unless otherwise stated, the term "or" means "and/or". The term "based on" means "at least partially based on". The terms "example embodiments" and "some embodiments" represent "at least one example embodiment". The terms "first", "second", and the like may indicate different or same objects. Other explicit and implicit definitions may also be included below.

The Institute of Electrical and Electronics Engineers (IEEE) 802.11 is one of the current mainstream wireless access standards and has been widely used in commercial applications in the past decade or so. FIG. 1 is a schematic diagram of a communication environment 100 in which embodiments of the present disclosure may be implemented. As shown in FIG. 1, there is an AP 110 and STAs 120, 130, and 140 in the communication environment 100. The AP 110 accesses an Internet 150 through a wired or wireless connection. The AP 110 may associate the STAs 120 and 130 to form a WLAN 102. Therefore, the stations STAs 120 and 130 may be connected to the Internet 150 via the AP 110. In the context of the present disclosure, the AP 110 and the STAs 120 to 140 may be collectively referred to as stations 110 to 140.

In the context of the present disclosure, uplink and downlink communication may be performed between the AP 110 and the associated STAs 120 and 130 by using a pre-determined protocol (for example, an IEEE 802.11 protocol), including point-to-multipoint transmission and point-to-point transmission. In addition, packet data based on various frame structures, for example, a PPDU, may be transmitted between the AP 110 and the STAs 120 and 130.

P2P communication may be performed between STAs through a peer-to-peer (P2P) link. For example, the stations 120 and 130 may perform P2P communication because a distance is relatively short. In another example, the stations 120 and 140 may directly perform P2P communication within a transmission range 104. The P2P link may be established based on Tunneled Direct Link Setup (TDLS) or another P2P wireless protocol. The embodiments described in this specification for P2P are also applied to device-to-device (D2D) communication or another communication protocol such as the TDLS. Therefore, the P2P protocol is used for example purposes only and is not intended to limit the scope of the present disclosure.

In some embodiments, the AP 110 may be, for example, a wireless router. The STAs 120 to 140 may include a wireless mobile device, for example, include but not limited to a smartphone, a notebook computer, a tablet computer, a smart wearable device, an in-vehicle mobile device, or the like.

It should be understood that the communication environment 100 is only used for example purposes and does not imply any limitation on the scope of this disclosure. Embodiments of this disclosure may be further embodied in another network environment or architecture. In addition, it should be further understood that the communication environment 100 may further include other elements or entities configured to implement purposes such as communication connection, data transmission, and network security. For brevity of description, these elements or entities are not shown in FIG. 1, but this does not mean that embodiments of this disclosure do not have these elements or entities.

The communication environment 100 according to an embodiment of this disclosure may be a wireless network that complies with any protocol that is currently known or to be developed in the future, including but not limited to a WLAN based on standards such as 802.11ac, 802.11n, 802.11g, 802.11b, and 802.11a, a NarrowBand-Internet of Things (NB-IOT) system, a Global System for Mobile Communications (GSM), an Enhanced Data rate for GSM Evolution (EDGE) system, a wideband code-division multiple access (WCDMA) system, a code-division multiple access 2000 (CDMA2000) system, a time division-synchronization code-division multiple access (TD-SCDMA) system, an LTE system, and a 5G New Radio (NR) network.

In the WLAN 102, wireless channel resources are shared by a plurality of devices 110 to 130. The AP 110 and the non-AP stations 120 and 130 use the channel resources through a contention mechanism. The devices 110 to 130 need to sense a channel before accessing the channel. Usually, the sensing is classified into physical carrier sense and virtual carrier sense. Energy on the channel and a signal of a WLAN radio frame are sensed to implement the physical carrier sense. When received energy or a strength of a received WLAN radio frame is less than a threshold, the physical carrier sense determines that the channel is idle. When received energy or a strength of a received WLAN radio frame is not less than a threshold, the physical carrier sense determines that the channel is busy.

A NAV is set to implement the virtual carrier sense. The NAV is equivalent to a timer mechanism. When a value of the NAV is not 0, the virtual carrier sense determines that the channel is busy. When a value of the NAV is 0, the virtual carrier sense determines that the channel is idle. For example, after a station correctly receives a radio frame, the station may update a NAV maintained by the station based on a duration field in the radio frame. When a receiver address (RA) of a received frame is a MAC address of the received frame, the station does not update the NAV. For another radio frame, when a value of the duration field is greater than a current value of the NAV of the station, the station updates the NAV based on the value of the duration field. Usually, the station is allowed to access the channel only when both the physical carrier sense and the virtual carrier sense determine that the channel is idle, to send the radio frame.

After the channel contention succeeds, the station may perform data transmission by using the channel resources. For example, the AP 110 may send data to the STA 120 that is located within a signal coverage area of the AP 110. The STA 140 is located outside the signal coverage area of the AP 110. That is, the AP 110 cannot know interference of the STA 140 to the STA 120 serving as a receiver. Through sensing, the STA 140 may discover the STA 120 within the transmission range 104 and expect to send data to the STA 120. As described above, the STA 140 cannot perceive ongoing data transmission between the AP 110 serving as a sender and the STA 120. In this case, if the STA 140 also sends data to the STA 120, the STA 120 receives the data from both the AP 110 and the STA 140 at the same time. As a result, a collision occurs, and the receiver STA 120 cannot correctly receive the radio frame. In this case, the STA 140 is also referred to as a hidden node, and an occurrence of the hidden node interferes with the receiver, and cannot sense another sender. As a result, data transmission fails.

The NAV mechanism may effectively avoid the collision problem caused by the hidden node. Through the virtual carrier sense, after the station serving as the sender competes for the channel, and before formal data transmission is performed, the station may first perform interaction of short frames with the station serving as the receiver. The two short frames for interaction each use the duration field thereof to enable a non-target station around both communication parties to set the NAV. In this way, it may be ensured that the hidden node does not perform channel contention and radio frame sending in a period of NAV protection. This period of NAV protection is commonly referred to as a TXOP.

In an early WLAN system, a station has only one NAV. In an IEEE 802.11ax standard, a dueling NAVs technology is introduced to implement fine-grained management. One NAV is referred to as an intra-BSS NAV, and the other NAV is referred to as a basic NAV. The intra-BSS NAV is updated by using an intra-BSS PPDU, and the basic NAV is updated by using an inter-BSS PPDU, or a PPDU that cannot be identified as an intra-BSS PPDU or an inter-BSS PPDU. In short, the inter-BSS PPDU may be a PPDU sent by a STA outside a current BSS, and the intra-BSS PPDU may be a PPDU sent by a station in a current BSS. For a specific manner of identifying the inter-BSS PPDU and the intra-BSS PPDU, refer to the IEEE 802.11ax standard. Therefore, details are not described herein again.

For a station that is not a TXOP holder, the intra-BSS NAV is updated if and only if the received frame meets all of the following conditions:

(1) The received frame is an intra-BSS frame;

(2) A value of the duration field of the received frame is greater than a current value of the intra-BSS NAV of the station; and (3) The RA of the received frame is not a MAC address of the station, or the received frame does not trigger the station to immediately respond, or the received frame is a trigger frame.

For a station, the basic NAV is updated if and only if the received frame meets all of the following conditions:

(1) The received frame is an inter-BSS frame or cannot be identified as an intra-BSS frame or an inter-BSS frame;

(2) A value of the duration field of the received frame is greater than a current value of the basic NAV of the station; and (3) The RA of the received frame is not a MAC address of the station.

If a value of any NAV in the intra-BSS NAV and the basic NAV is set to non-zero, the virtual carrier sense considers that the current channel is busy and is being occupied by another station. If both the intra-BSS NAV and the basic NAV are 0, the virtual carrier sense considers that the channel is idle, and in this case, the station can perform channel contention. When a station is triggered by an associated AP to perform an immediate response, the station may perform a response if a physical carrier sense of the station is idle and the value of the basic NAV is 0. If the basic NAV is not 0, no response can be performed even if a physical carrier sense result is idle.

In addition to the NAV or the dueling NAVs, a timer TXNAV may be further maintained inside the station serving as the TXOP holder, and the timer TXNAV is initialized by using a duration field or an ID field of a frame that is recently successfully sent by the TXOP holder. That is, a duration of the TXNAV is equivalent to a remaining duration of a current TXOP. The TXNAV counts down after an end of the PPDU carrying the frame.

In the IEEE 802.11be standard, a TXOP mechanism is extended. Further, the station serving as the TXOP holder may allocate a part of time resources in the TXOP to a first station associated with the station, and the first station may perform P2P communication with another station, for example, a second station, or send uplink data to the TXOP holder in an allocated period. This mechanism is referred to as a triggered TXOP sharing mechanism. A collision caused by contention for the channel with the station that shares the TXOP with the AP is reduced so that this mechanism improves system efficiency.

Figure 2:
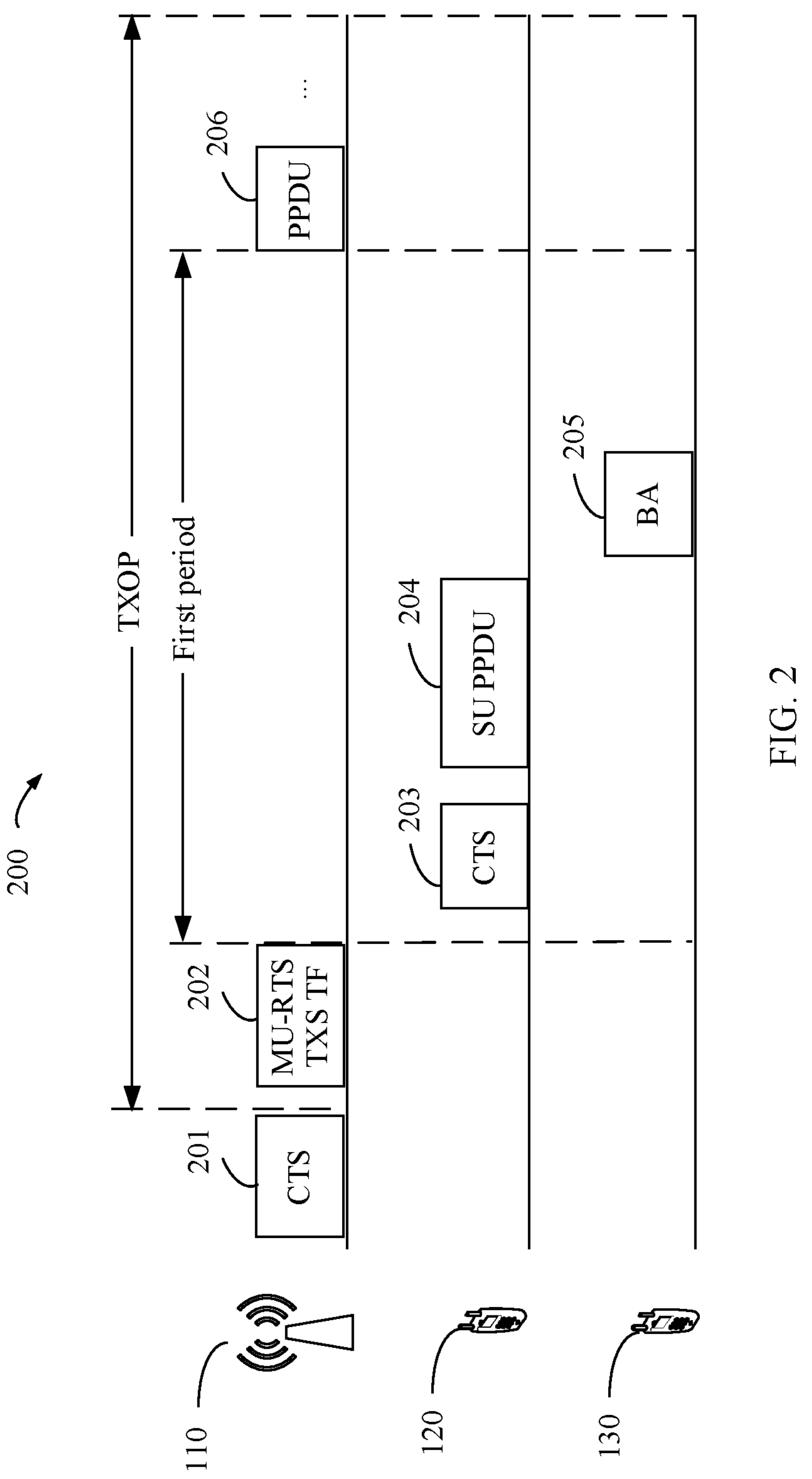
FIG. 2 is a schematic diagram of a triggered TXOP sharing mechanism according to an embodiment of the present disclosure.

FIG. 2 is a schematic diagram of a triggered TXOP sharing mechanism 200 according to an embodiment of the present disclosure. The mechanism 200 may relate to the AP 110 and the STAs 120 and 130, as shown in FIG. 1. For ease of description, the following describes the triggered TXOP sharing mechanism 200 with reference to FIG. 1.

As shown in FIG. 2, the AP 110 that obtains a TXOP in a WLAN may enter a TXOP period after sending a short frame CTS 201. Then, the AP 110 may allocate a first period in the TXOP to the STA 120 for data transmission by sending an MU-RTS TXS TF 202 to the STA 120. Then, the STA 120 may then occupy a channel by sending a CTS 203, and send a single-user (SU) PPDU 204 to the STA 130 by using a resource in the first period. After receiving the SU PPDU 204, the STA 130 may send a block acknowledgment (BA) 205 to the STA 120. After the first period ends, the AP 110 may continue to perform data transmission in the current TXOP, for example, send a PPDU 206.

Before the first period ends, if the STA 120 sends information to the AP 110 to return a remaining first period to the AP 110. That is, when the STA 120 terminates data transmission in the first period in advance, the AP 110 may obtain an opportunity of sending data in the first period.

In addition, after the STA 120 sends the SU PPDU 204, the AP 110 sets a NAV based on a duration field in the SU PPDU 204. An RA of the SU PPDU 204 is a MAC address of the STA 130 instead of a MAC address of the AP 110. Therefore, according to a regular NAV setting rule, data transmission of the AP 110 in a subsequent TXOP is affected after the AP 110 updates the NAV.

To resolve the foregoing or other potential problems, example embodiments of the present disclosure provide an enhanced NAV setting mechanism. According to the enhanced mechanism, the AP that obtains the TXOP may conditionally not update the NAV or conditionally ignore the NAV. In this way, the following problem may be avoided: data transmission cannot be performed normally in the remaining TXOP time because the AP sets the NAV after receiving a PPDU sent by the STA sharing the TXOP or by an overlapped basic service set (OBSS) STA.

According to some example embodiments of the present disclosure, an AP may, based on a pre-determined rule or condition, not update a NAV maintained by the AP, and this implementation is applicable to an AP that supports dueling NAVs and an AP that does not support dueling NAVs. The following describes a flowchart of a communication method 300 according to an embodiment of the present disclosure with reference to FIG. 3. The method 300 may be implemented in the AP 110 shown in FIG. 1. For ease of discussion, the method 300 is described below with reference to FIG. 1. It should be understood that the method 300 is also applicable to other communication scenarios and devices.

Figures 3, 4:
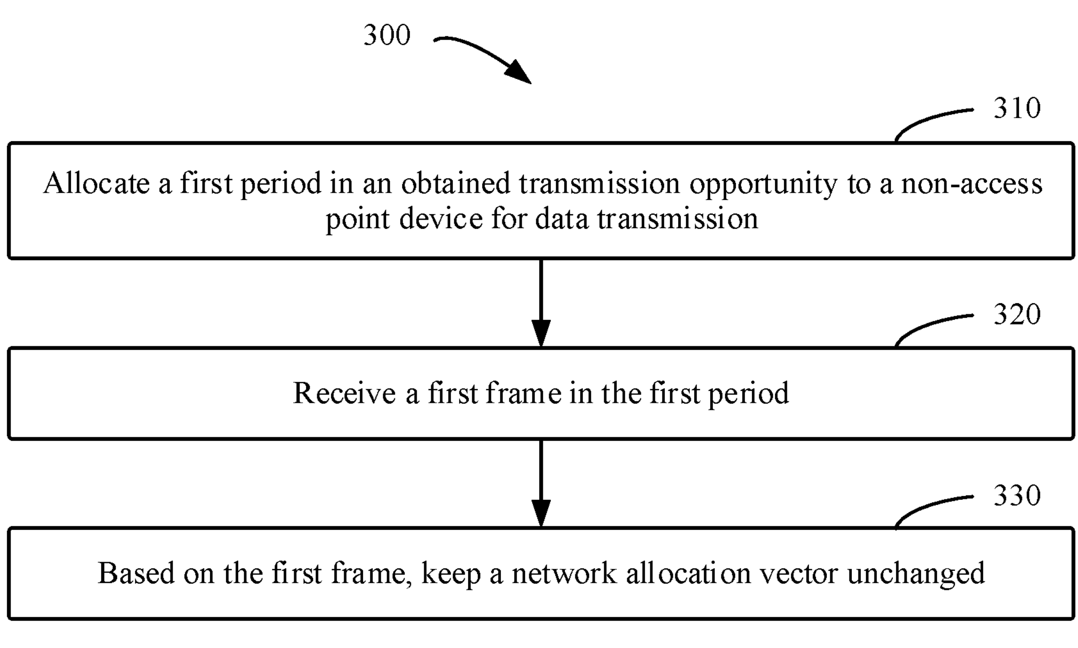
FIG. 3 is a flowchart of a communication method according to an embodiment of the present disclosure.
FIG. 4 is a flowchart of a communication method according to an embodiment of the present disclosure.

As shown in FIG. 3, in 310, the AP 110 that obtains a TXOP in the WLAN 102 allocates a first period in the TXOP to a non-access point device (that is, the STA 120) for data transmission. In the example of FIG. 2, the AP 110 may allocate the first period in the TXOP to the STA 120 for data transmission by sending the MU-RTS TXS TF 202 to the STA 120.

In some example embodiments, a resource in the first period may be used for P2P communication between the STA 120 and the STA 130, or uplink transmission between the STA 120 and the AP 110.

In 320, the AP 110 receives a first frame in the first period. An RA or a transmitter address (TA) of the first frame may be associated with the STA 120. In the example of FIG. 2, the first frame may be the SU PPDU 204. The TA of the SU PPDU 204 is associated with the STA 120.

In 330, the AP 110 keeps, based on the first frame, a NAV unchanged.

In some example embodiments, the AP 110 may conditionally choose to update or not to update the NAV. For example, the AP may be associated with the STA 120 only based on the RA or the TA of the first frame without updating the NAV in the first period.

In some embodiments in which the AP 110 supports dueling NAVs, the AP 110 may maintain two NAVs, and the AP 110 may update an intra-BSS NAV in the two NAVs based on conditions being met. The conditions include the following. The first frame is an intra-BSS frame, first duration (that is, a duration field) that is used for data transmission and that is included in the first frame is greater than second duration indicated by an intra-BSS NAV currently maintained by the AP 110, the RA of the first frame is not a MAC address of the AP 110, and neither the RA nor a TA of the first frame is a MAC address of the STA 120.

In the example shown in FIG. 2, some of the foregoing conditions are not met, for example, the TA of the SU PPDU 204 is associated with the STA 120, and therefore the AP 110 may not update the intra-BSS NAV.

In some other embodiments in which the AP 110 supports dueling NAVs, the AP 110 may update a basic NAV in two NAVs based on conditions being met. The conditions include the following. The first frame is an inter-BSS frame, or the first frame is not identified by any one of an inter-BSS or an intra-BSS. That is, the first frame cannot be identified as an intra-BSS frame or an inter-BSS frame, first duration (that is, a duration field) that is used for data transmission and that is included in the first frame is greater than second duration indicated by a basic NAV currently maintained by the AP 110, the RA of the first frame is not a MAC address of the AP 110, and neither the RA nor the TA of the first frame is a MAC address of the STA 120.

In the example shown in FIG. 2, some of the foregoing conditions are not met, for example, the TA of the SU PPDU 204 is associated with the STA 120, and therefore the AP 110 may not update the basic NAV.

In embodiments in which the AP 110 maintains a single NAV, regardless of whether the first frame is an intra-BSS PPDU, an inter-BSS PPDU, or a PPDU that cannot be identified as an intra-BSS PPDU or an inter-BSS PPDU, the AP 110 may not update the NAV provided that the RA or the TA included in the first frame is the MAC address of the STA 120.

In an existing standard, if the RA of a PPDU that is received by the AP 110 in the first period and that is used to carry the first frame is not the MAC address of the AP 110, and received energy of the PPDU is greater than −82 decibel-milliwatts (dBm), the AP 110 updates the NAV. Herein, −82 dBm is for a PPDU of a 20 megahertz (MHz) bandwidth, and for a PPDU of a larger bandwidth, a threshold also needs to be correspondingly increased. For example, thresholds corresponding to 40 MHZ, 80 MHz, 160 MHz, and 320 MHz PPDUs are respectively −79 dBm, −76 dBm, −73 dBm, and −70 dBm.

According to some example embodiments of the present disclosure, a received energy threshold is increased to some extent (for example, increased to −72 dBm), so that some PPDUs with received energy greater than −82 dBm do not cause the AP 110 to update the NAV, thereby reducing a probability that the AP 110 sets the NAV in the first period. In such embodiments, the AP 110 determines the received energy for the PPDU for carrying the first frame. If the received energy of the AP 110 does not exceed a predetermined energy threshold (for example, an increased energy threshold), the AP 110 keeps the NAV unchanged.

When the AP 110 supports dueling NAVs, when the RA of the PPDU received in the first period is not the MAC address of the AP 110, and the received energy is less than a specific threshold, if the PPDU is an intra-BSS PPDU, the AP 110 does not need to update the intra-BSS NAV. If the frame is an inter-BSS PPDU or cannot be identified as an intra-BSS PPDU or an inter-BSS PPDU, the AP 110 does not need to update the basic NAV. For a PPDU of a 20 MHz bandwidth, the threshold may be set to be greater than −82 dBm. As the PPDU bandwidth increases, the threshold may be correspondingly adjusted in proportion. Details are not described herein.

When the AP 110 does not support dueling NAVs, when the RA of the PPDU received in the first period is not the MAC address of the AP 110, and the received energy is less than a specific threshold, the AP 110 does not need to update the NAV. Similarly, for a PPDU of a 20 MHz bandwidth, the threshold may be set to be greater than −82 dBm. As the PPDU bandwidth increases, the threshold may be correspondingly increased.

In an alternative implementation of the foregoing embodiments, the AP 110 may not update the NAV based on a received PPDU with received energy being less than a specific threshold before a TXNAV expires. In this way, the following case may be further avoided: after the first period ends, data cannot be sent in the remaining TXOP because the AP 110 sets the basic NAV or the NAV based on an OBSS PPDU.

In some example embodiments, after 330, the AP 110 may use RTS/CTS or MU-RTS/CTS before sending data within the TXOP. For example, before the AP 110 sends the data within the TXOP, the AP 110 may send an RTS frame to at least one receiving device, and receive a CTS frame from the at least one receiving device. Then, the AP 110 may send data to the at least one receiving device based on the received CTS frame.

As a simplified implementation of the foregoing embodiments, after a portion of the TXOP (that is, the first period) is allocated to the STAs 120, the AP 110 may not update the NAV at all times in the first period, regardless of whether the conditions discussed above are met or not.

In some example embodiments, the AP 110 may be an EHT access point, including but not limited to an AP such as an 802.11be-based communication server, a router, a switch, a bridge, or the like, as well as a cell phone, a tablet computer, a computer laptop, a smartwatch, a smart television, and the like.

According to example embodiments of the present disclosure, an enhanced NAV setting mechanism is provided. According to the enhanced mechanism, the station that obtains the TXOP may conditionally choose to update or not to update the NAV, to avoid or reduce that the station sets the NAV in the first period or the TXOP, so that the station may continue to perform data transmission in the remaining TXOP.

According to some example embodiments of the present disclosure, an AP may, based on a pre-determined rule or condition, update a NAV maintained by the AP, and this implementation is applicable to an AP that supports dueling NAVs and an AP that does not support dueling NAVs. The following describes a flowchart of a communication method 400 according to an embodiment of the present disclosure with reference to FIG. 4. The method 400 may be implemented in the AP 110 shown in FIG. 1. For ease of discussion, the method 400 is described below with reference to FIG. 1. It should be understood that the method 400 is also applicable to other communication scenarios and devices.

As shown in FIG. 4, in 410, the AP 110 that obtains a TXOP in a WLAN allocates a first period in the TXOP to a non-access point device, for example, the STA 120, for data transmission. As described above, the AP 110 may allocate the first period in the TXOP to the STA 120 for data transmission by sending the MU-RTS TXS TF 202 to the STA 120.

In some example embodiments, a resource in the first period may be used for P2P communication between the STA 120 and the STA 130, or uplink transmission between the STA 120 and the AP 110.

In 420, the AP 110 receives a first frame in the first period. In the example of FIG. 2, the first frame may be the SU PPDU 204. The TA of the SU PPDU 204 is associated with the STA 120.

In 430, the AP 110 determines whether pre-determined conditions are all met. In some example embodiments, the pre-determined conditions may include the following. First duration (that is, a value of a duration field) indicated by the first frame is greater than a current value of a NAV of the AP 110, an RA of the first frame is not a MAC address of the AP 110, or the AP 110 is not a TXOP holder and a PPDU carrying the first frame does not include a frame requesting an immediate response from the AP 110, or the AP 110 is not a TXOP holder and the first frame is a trigger frame, and neither the RA nor a TA of the first frame is a MAC address of the STA 120.

In 440, if the pre-determined conditions are met, the AP 110 updates a NAV.

In embodiments in which the AP 110 maintains a single NAV, regardless of whether the first frame is an intra-BSS PPDU, an inter-BSS PPDU, or a PPDU that cannot be identified as an intra-BSS PPDU or an inter-BSS PPDU, the NAV may be updated provided that the foregoing conditions are met. Otherwise, if at least one of the foregoing conditions is not met, the AP 110 does not update the NAV. For example, in the example of FIG. 2, the RA field of the first frame indicates the MAC address of the STA 120, and therefore the AP 110 does not update the NAV.

In some embodiments in which the AP 110 supports dueling NAVs, the AP 110 updates an intra-BSS NAV in two NAVs if and only if the following conditions are met: the first frame is an intra-BSS frame, and for classification and definitions of the intra-BSS PPDU and the inter-BSS PPDU, refer to section 26.2.2 in an IEEE 802.11ax standard, the first duration (that is, the value of the duration field) included in the first frame is greater than a current value of the intra-BSS NAV of the AP 110, an RA of the first frame is not a MAC address of the AP 110, or the AP 110 is not a TXOP holder and a PPDU carrying the first frame does not include a frame requesting an immediate response from the AP 110, or the AP 110 is not a TXOP holder and the first frame is a trigger frame, and neither the RA nor the TA of the first frame is a MAC address of the STA 120.

If at least one of the foregoing conditions is not met, the AP 110 does not update the intra-BSS NAV.

In addition, in some embodiments in which the AP 110 supports dueling NAVs, the AP 110 updates a basic NAV in two NAVs if and only if the following conditions are met: the first frame is an inter-BSS frame, or the first frame cannot be identified as an intra-BSS or an inter-BSS, the first duration (that is, the value of the duration field) included in the first frame is greater than a current value of the basic NAV of the AP 110, the RA of the first frame is not a MAC address of the AP 110, and neither the RA nor the TA of the first frame is a MAC address of the STA 120.

If at least one of the foregoing conditions is not met, the AP 110 does not update the basic NAV.

In some example embodiments, after 430, the AP 110 may use RTS/CTS or MU-RTS/CTS before sending data within the TXOP. For example, before the AP 110 sends the data within the TXOP, the AP 110 may send an RTS frame to at least one receiving device, and receive a CTS frame from the at least one receiving device. Then, the AP 110 may send data to the at least one receiving device based on the received CTS frame.

Example embodiments of the present disclosure provide a triggered TXOP sharing mechanism. According to this mechanism, the AP that obtains the TXOP may allocate at least a portion of the TXOP to another non-AP station. When the AP receives a frame including an RA or a TA corresponding to a MAC address of the non-AP, the AP may not update its NAV. Through this mechanism, the following case may be avoided or reduced: the AP cannot perform data transmission within a remaining time of the TXOP due to an update of the NAV. In this way, resource efficiency of a communication network is improved, and system performance and communication quality are ensured.

According to some example embodiments of the present disclosure, an AP may, based on a pre-determined rule or condition, ignore a NAV maintained by the AP, and this implementation is applicable to an AP that supports dueling NAVs and an AP that does not support dueling NAVs. The following describes a flowchart of a communication method 500 according to an embodiment of the present disclosure with reference to FIG. 5. The method 500 may be implemented in the AP 110 shown in FIG. 1. For ease of discussion, the method 500 is described below with reference to FIG. 1. It should be understood that the method 500 is also applicable to other communication scenarios and devices.

Figure 5:
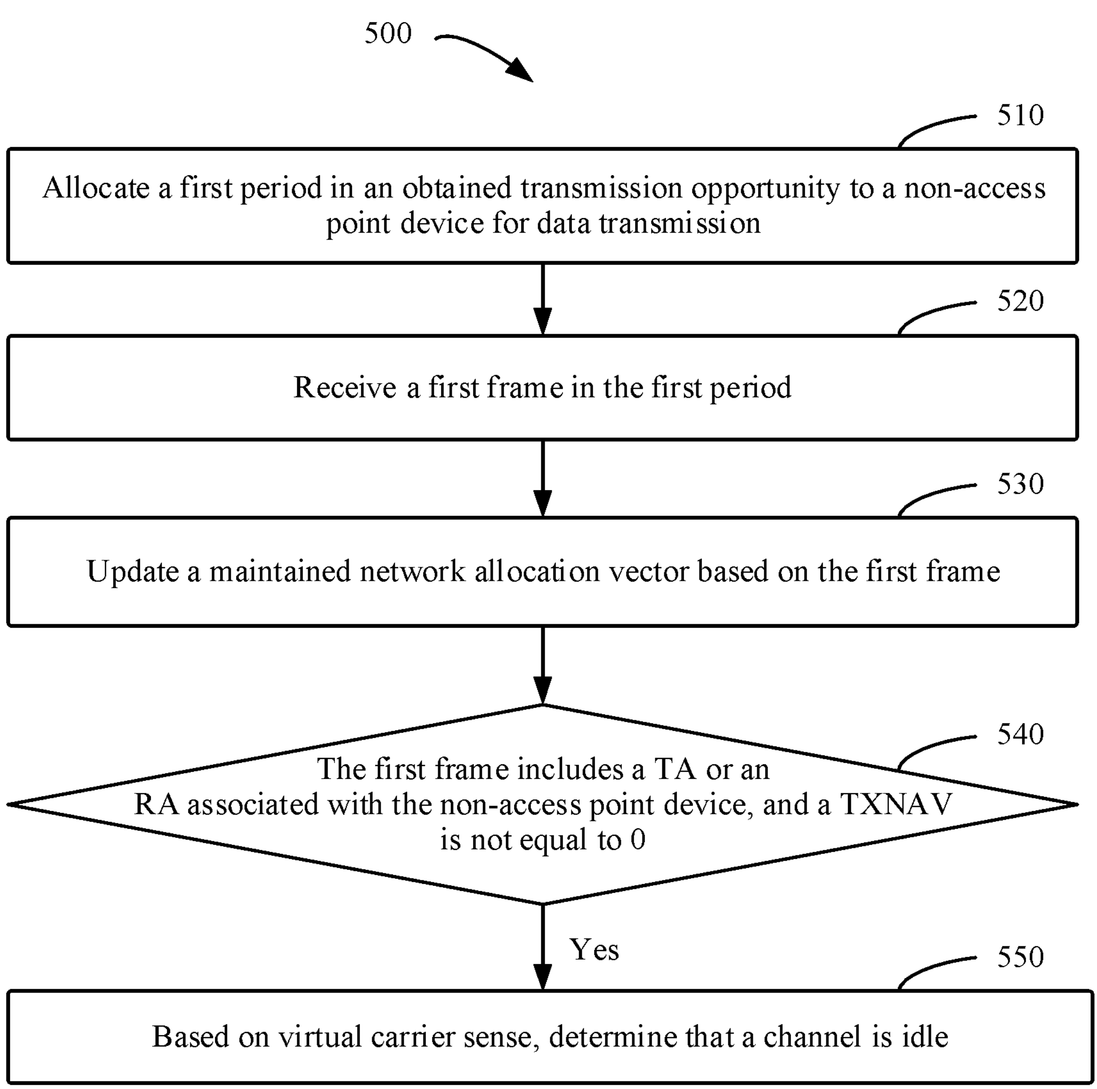
FIG. 5 is a flowchart of a communication method according to an embodiment of the present disclosure.

As shown in FIG. 5, in 510, the AP 110 that obtains a TXOP in a WLAN allocates a first period in the TXOP to a non-access point device, for example, the STA 120, for data transmission. In the example of FIG. 2, the AP 110 may allocate the first period in the TXOP to the STA 120 for data transmission by sending the MU-RTS TXS TF 202 to the STA 120.

In 520, the AP 110 receives a first frame in the first period. In the example of FIG. 2, the first frame may be the SU PPDU 204. The TA of the SU PPDU 204 is associated with the STA 120.

In 530, the AP 110 updates, based on the first frame, a NAV maintained by the AP 110.

In 540, the AP 110 determines whether a TA or an RA of the first frame is associated with the STA 120 and that a TXNAV is not equal to 0. In some example embodiments, that "the TA or the RA of the first frame is associated with the STA 120 and the TXNAV is not equal to 0" may be referred to as a pre-determined condition.

If the TA or the RA of the first frame is associated with the STA 120 and the TXNAV is not equal to 0, in 550, the AP 110 determines, based on virtual carrier sense, that a channel is idle.

In embodiments in which the AP 110 does not support dueling NAVs, when the TXNAV is not equal to 0, that is, during a remaining TXOP, the AP 110 may ignore the NAV or in other words, consider a value of the NAV as 0. In this way, even if the value of the NAV is not equal to 0, the AP 110 may still send data during the remaining TXOP.

In some embodiments in which the AP 110 supports dueling NAVs, the NAV may be either an intra-BSS NAV or a basic NAV. For example, when an updated NAV is an intra-BSS NAV, if a value of the basic NAV is equal to 0, the AP 110 determines, based on virtual carrier sense, that the channel is idle. On the contrary, if a value of the basic NAV is not equal to 0, the AP 110 determines, based on virtual carrier sense, that the channel is busy.

In some other embodiments in which the AP 110 supports dueling NAVs, when an updated NAV is a basic NAV, if a value of an intra-BSS NAV is equal to 0, the AP 110 determines, based on virtual carrier sense, that the channel is idle. On the contrary, if a value of the intra-BSS NAV is not equal to 0, the AP 110 determines, based on virtual carrier sense, that the channel is busy.

In still some embodiments in which the AP 110 supports dueling NAVs, if both the intra-BSS NAV and the basic NAV are updated, that is, values of both are not equal to 0, the AP 110 determines, based on virtual carrier sense, that the channel is idle.

In embodiments in which the AP 110 supports dueling NAVs, if the values of two NAVs are 0, the AP 110 determines, based on virtual carrier sense, that the channel is idle. If at least one NAV of the two NAVs is not 0 and the pre-determined condition "the TA or the RA of the first frame is associated with the STA 120, and the TXNAV is not equal to 0" is not met, the AP 110 determines, based on virtual carrier sense, that the channel is busy.

In embodiments in which the channel is determined to be idle, after 550, the AP 110 may use RTS/CTS or MU-RTS/CTS before sending data within the TXOP. For example, before the AP 110 sends the data within the TXOP, the AP 110 may send an RTS frame to at least one receiving device, and receive a CTS frame from the at least one receiving device. Then, the AP 110 may send data to the at least one receiving device based on the received CTS frame. In this way, a collision between a PPDU sent by the AP 110 and a PPDU being sent in a P2P link or an OBSS may be reduced. The RTS is a short frame. If the RTS conflicts with a PPDU being transmitted in the P2P link or the OBSS, the RTS frame interferes with only a portion of the PPDU being transmitted. When an A-MPDU is used in the PPDU, only a portion of the MPDU in the PPDU is affected. In addition, the affected portion may be corrected by using a FEC.

According to example embodiments of the present disclosure, a triggered TXOP sharing mechanism is provided. The AP that obtains a TXOP and maintains dueling NAVs may share a portion of the TXOP, for example, an allocation period, with a non-AP station. In this mechanism, if only the intra-BSS NAV is updated based on a radio frame in the allocation period, a TA or an RA of the frame is a MAC address of the non-AP station, and the value of the TXNAV is not equal to 0, the virtual carrier sense indicates that a channel is idle when a basic NAV timer is 0, otherwise, when a basic NAV timer is not 0, the virtual carrier sense indicates that a channel is busy, if only the basic NAV is updated based on a radio frame in the allocation period, a TA or an RA of the frame is a MAC address of the non-AP station, and the value of the TXNAV is not equal to 0, the virtual carrier sense indicates that a channel is idle when an intra-BSS NAV timer is 0, otherwise, when an intra-BSS NAV timer is not 0, the virtual carrier sense indicates that a channel is busy, if both the intra-BSS NAV and the basic NAV are updated based on a radio frame in the allocation period, a TA or an RA of these frames is a MAC address of the non-AP station, and the value of the TXNAV is not equal to 0, the virtual carrier sense indicates that a channel is idle, and otherwise, if values of the two NAV timers are both 0, the virtual carrier sense indicates that a channel is idle, or if a value of at least one of the two NAV timers is not 0, the virtual carrier sense indicates that a channel is busy.

Through the foregoing mechanism, the following case may be avoided or reduced: the AP that obtains the TXOP cannot send data within the remaining TXOP because the NAV of the P2P link or the OBSS PPDU is set when the TXNAV is not equal to 0. Therefore, resource efficiency of a communication network is improved, and system performance and communication quality are ensured.

In some other embodiments of the present disclosure, a simplified form of the method 500 described with reference to FIG. 5 is provided. As discussed previously, in the method 500, the AP 110 may ignore the value of the NAV or consider the value of the NAV as 0 based on a pre-determined condition that "the TA or the RA of the first frame is associated with the STA 120, and the TXNAV is not equal to 0" is met. In some other example embodiments, the AP 110 may ignore the value of the NAV or consider the value of the NAV as 0 based on a pre-determined condition: "the TXNAV is not equal to 0".

In some embodiments in which the AP 110 supports dueling NAVs, the AP 110 ignore the intra-BSS NAV and the basic NAV when the TXNAV is not equal to 0. In other words, the AP 110 may consider values of the intra-BSS NAV and the basic NAV as 0.

In some embodiments in which the AP 110 does not support dueling NAVs, the AP 110 ignore the NAV when the TXNAV is not equal to 0. In other words, the AP 110 may consider the value of the NAV as 0.

As an alternative embodiment, the AP 110 may ignore the value of the NAV or consider the value of the NAV as 0 based on the pre-determined condition that "the TXNAV is not equal to 0 and the NAV is less than or equal to the TXNAV" being met. When the pre-determined condition is met, that is, the TXNAV is not equal to 0 and the NAV is less than or equal to the TXNAV, the AP 110 may ignore the NAV, or consider the NAV as 0.

In this alternative embodiment, for the AP 110 that supports dueling NAVs, if the intra-BSS NAV is less than or equal to the TXNAV, the AP 110 may ignore the intra-BSS NAV, or consider the intra-BSS NAV as 0. If the intra-BSS NAV is greater than the TXNAV and the TXNAV is not equal to 0, the AP 110 may ignore a portion of the intra-BSS NAV that is less than or equal to the TXNAV, or consider the intra-BSS NAV as 0 when the TXNAV is not equal to 0. Similarly, if the basic NAV is less than or equal to the TXNAV, the AP 110 may ignore the basic NAV or consider the basic NAV as 0. If the basic NAV is greater than the TXNAV and the TXNAV is not equal to 0, the AP 110 may ignore a portion of the basic NAV that is less than or equal to the TXNAV, or consider the basic NAV as 0 when the TXNAV is not equal to 0.

In this alternative implementation, for the AP 110 that does not support dueling NAVs, if the NAV is less than or equal to the TXNAV, the AP 110 may ignore the NAV, or consider the NAV as 0. If the NAV is greater than the TXNAV and the TXNAV is not equal to 0, the AP 110 may ignore a portion of the NAV that is less than or equal to the TXNAV, or consider the NAV as 0 when the TXNAV is not equal to 0.

In some example embodiments, the AP 110 may use RTS/CTS or MU-RTS/CTS before sending data within the TXOP. In this way, a collision between a PPDU sent by the AP 110 and a PPDU being sent in a P2P link or an OBSS may be reduced. The RTS is a short frame. If the RTS conflicts with a PPDU being transmitted in the P2P link or the OBSS, the RTS frame interferes with only a portion of the PPDU being transmitted. When an A-MPDU is used in the PPDU, only a portion of the MPDU in the PPDU is affected. In addition, the affected portion may be corrected by using a FEC.

Figure 6:
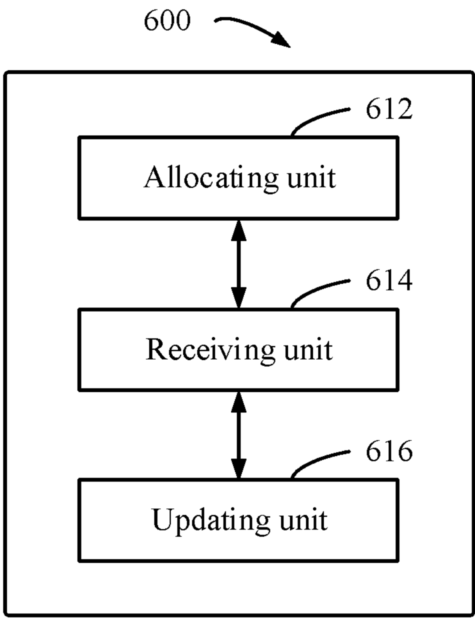
FIG. 6 is a schematic block diagram of a communication device according to an embodiment of the present disclosure.

FIG. 6 is a schematic block diagram of a communication device 600 according to an example embodiment of the present disclosure. The communication device 600 shown in FIG. 6 may be implemented at a transmitting end or a receiving end of communication, including but not limited to an AP, a STA, and the like. Certainly, another proper device may also be used for implementation. It should be understood that the communication device 600 is only used for example purposes and does not imply any limitation on the scope of the present disclosure. Embodiments of the present disclosure may be further embodied in communication devices with different architectures and functions. It should be further understood that the communication device 600 may further include other elements or entities that are not shown for ease of description, but this does not mean that embodiments of the present disclosure do not have these elements or entities.

As shown in FIG. 6, the communication device 600 includes an allocating unit 612, a receiving unit 614, and an updating unit 616.

The allocating unit 612 is configured to allocate a first period in a TXOP to a non-access point device for data transmission.

The receiving unit 614 is configured to receive a first frame in the first period. An access address or a transmitter address of the first frame is associated with the non-access point device.

The updating unit 616 is configured to keep, based on the first frame, a maintained NAV unchanged.

It should be understood that the allocating unit 612, the receiving unit 614, and the updating unit 616 in the communication device 600 may be configured to implement other steps in the communication process discussed in FIG. 3. For specific details, refer to the foregoing related descriptions. Details are not described herein again.

It should be understood that the communication device 600 may be implemented by using an application-specific integrated circuit (ASIC), one or more field-programmable gate arrays (FPGAs), a programmable logic device (PLD), a controller, a state machine, a gate logic, a discrete hardware component, any other suitable circuit, or any combination of circuits that can perform various processes of the present disclosure, a chip, a board, a communication device, or the like.

Figure 7:
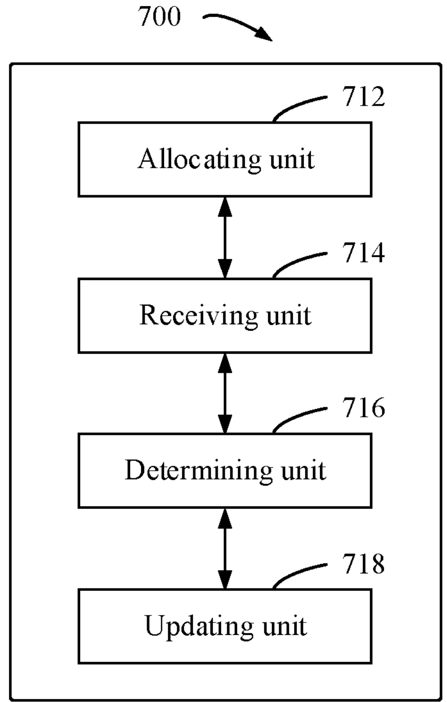
FIG. 7 is a schematic block diagram of a communication device according to an embodiment of the present disclosure.

FIG. 7 is a schematic block diagram of a communication device 700 according to an example embodiment of the present disclosure. The communication device 700 shown in FIG. 7 may be implemented by using any suitable device. It should be understood that the communication device 700 is only used for example purposes and does not imply any limitation on the scope of the present disclosure. Embodiments of the present disclosure may be further embodied in communication devices with different architectures and functions. It should be further understood that the communication device 700 may further include other elements or entities that are not shown for ease of description, but this does not mean that embodiments of the present disclosure do not have these elements or entities.

As shown in FIG. 7, the communication device 700 includes an allocating unit 712, a receiving unit 714, a determining unit 716, and an updating unit 718.

The allocating unit 712 is configured to allocate a first period in a TXOP to a non-access point device for data transmission.

The receiving unit 714 is configured to receive a first frame in the first period.

The determining unit 716 is configured to determine whether the following conditions are all met: the first frame is an inter-BSS frame, or the first frame is not identified by either an inter-BSS or an intra-BSS, first duration that is used for data transmission and that is included in the first frame is greater than second duration indicated by a basic NAV currently maintained by the access point device, a receiver address of the first frame is not a MAC address of the access point device, and an access address or a transmitter address of the first frame is not associated with the non-access point device.

The updating unit 718 is configured to update a NAV when the pre-determined conditions are met.

It should be understood that the communication device 700 may be implemented by using an ASIC, one or more FPGAs, a PLD, a controller, a state machine, a gate logic, a discrete hardware component, any other suitable circuit, or any combination of circuits that can perform various processes of the present disclosure, a chip, a board, a communication device, or the like.

Figure 8:
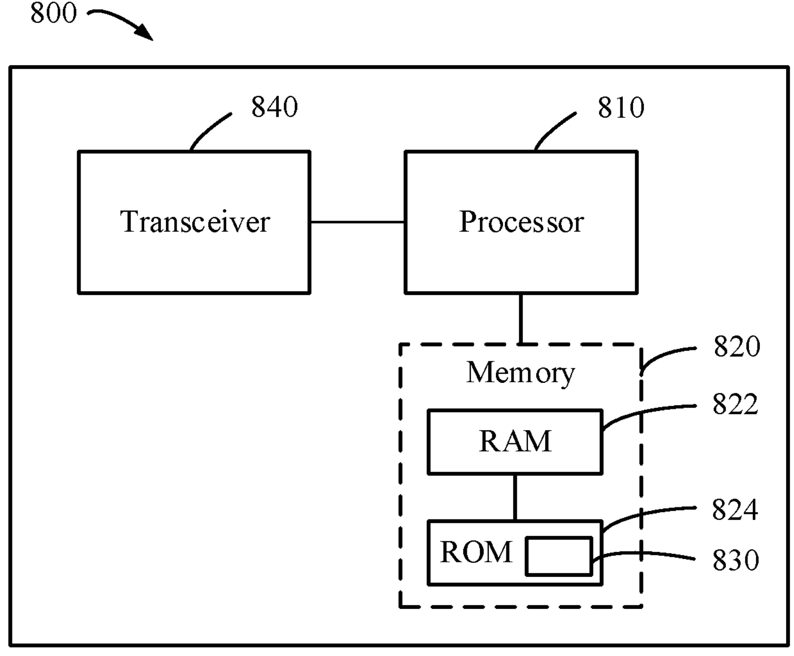
FIG. 8 is a simplified block diagram of an example device suitable for implementing some embodiments of the present disclosure.

FIG. 8 is a simplified block diagram of an example device 800 suitable for implementing embodiments of the present disclosure. The device 800 may be configured to implement a communication device or a communication device in the present disclosure. As shown in the figure, the device 800 includes one or more processors 810 and a transceiver 840 coupled to the processor 810.

In some example implementations, the transceiver 840 is configured to implement a function of the receiving unit 614 in FIG. 6 or the receiving unit 714 in FIG. 7. For specific details, refer to the foregoing descriptions. Details are not described herein again.

The processor 810 may be configured to implement functions of the allocating unit 612 and the updating unit 616 in FIG. 6, or functions of the allocating unit 712, the determining unit 716, and the updating unit 718 in FIG. 7. For specific details, refer to the foregoing descriptions in FIG. 6 and FIG. 7, and details are not described herein again.

Optionally, the device 800 further includes a memory 820 coupled to the processor 810. The memory 820 is configured to store instructions executed by the processor. When the instructions are executed by the processor, the processor may implement functions of the allocating unit 612 and the updating unit 616 in FIG. 6, or functions of the allocating unit 712, the determining unit 716, and the updating unit 718 in FIG. 7. For specific details, refer to the foregoing descriptions. Details are not described herein again.

The transceiver 840 may be configured to perform bidirectional communication. The transceiver 840 may have at least one communication interface for communication. The communication interface may include any interface necessary for communicating with another device.

The processor 810 may be of any proper type suitable for a local technical network, and may include but be not limited to one or more of a general-purpose computer, a dedicated computer, a microcontroller, a digital signal processor (DSP), and a controller-based multi-core controller architecture. The device 800 may have a plurality of processors, such as an application-specific integrated circuit chip, which in time belongs to a clock synchronized with a main processor.

The memory 820 may include one or more non-volatile memories and one or more volatile memories. For example, a non-volatile memory includes but is not limited to a read-only memory (ROM) 824, an erasable programmable ROM (EPROM), a flash memory, a hard disk, a compact disc (CD), a DIGITAL VERSTILE DISC (DVD), and another magnetic storage device and/or optical storage device. For example, a volatile memory includes but is not limited to a random-access memory (RAM) 822 and another volatile memory that does not persist during power-off duration.

A computer program 830 includes computer executable instructions executed by the associated processor 810. The program 830 may be stored in a ROM 824. The processor 810 may perform any proper actions and processing by loading the program 830 into a RAM 822.

Embodiments of the present disclosure may be implemented with the help of the program 830, so that the device 800 may perform any process discussed with reference to FIG. 2 to FIG. 5. Embodiments of the present disclosure may alternatively be implemented by using a hardware or a combination of software and hardware.

In some embodiments, the program 830 may be tangibly included in a computer-readable medium. The computer-readable medium may be included in the device 800 (for example, in the memory 820) or another storage device that may be accessed by the device 800. The program 830 may be loaded from the computer-readable medium into the RAM 822 for execution. The computer-readable medium may include any type of tangible nonvolatile memories, such as a ROM, an EPROM, a flash memory, a hard disk, a CD, and a DVD.

Usually, various embodiments of the present disclosure may be implemented by hardware or a dedicated circuit, software, logic, or any combination thereof. Some aspects may be implemented by hardware, and other aspects may be implemented by firmware or software, and may be performed by a controller, a microprocessor, or another computing device. Although aspects of embodiments of the present disclosure are shown and described as block diagrams, flowcharts, or represented by using some other graphics, it should be understood that the blocks, devices, systems, techniques, or methods described in this specification may be implemented as, for example, non-limiting examples, in hardware, software, firmware, dedicated circuit or logic, general-purpose hardware or controllers or other computing devices, or some combinations thereof.

The present disclosure further provides at least one computer program product tangibly stored on a non-transitory computer-readable storage medium. The computer program product includes computer executable instructions, such as instructions included in a program module, and are executed in a device on a real or virtual target processor, to perform the process/method as described above with reference to FIG. 3 to FIG. 5. Usually, the program module includes a routine, a program, a library, an object, a class, a component, a data structure, and the like that may execute a particular task or implement a particular abstract data type. In various embodiments, functions of program modules may be combined or a function of a program module may be split as needed. Machine executable instructions for the program module may be executed locally or in a distributed device. In the distributed device, the program module may be located in local and remote storage media.

Computer program code used to implement methods of the present disclosure may be written by using one or more programming languages. The computer program code may be provided for a processor of a general-purpose computer, a dedicated computer, or another programmable data processing apparatus. In this way, when the program code is executed by the computer or the other programmable data processing apparatus, functions/operations specified in the flowcharts and/or block diagrams are implemented. The program code may be executed all on a computer, partially on a computer, as an independent software package, partially on a computer and partially on a remote computer, or all on a remote computer or server.

In the context of the present disclosure, the computer program code or related data may be carried by any appropriate carrier, so that a device, an apparatus, or a processor can perform various processing and operations described above. For example, the carrier includes a signal, a computer-readable medium, and the like. For example, the signal may include propagating signals in electrical, optical, radio, sound, or other forms, such as carrier waves and infrared signals.

The computer-readable medium may be any tangible medium that includes or stores a program used to or related to an instruction-executing system, a device, or an apparatus. The computer-readable medium may be a computer-readable signal medium or a computer-readable storage medium. The computer-readable medium may include but be not limited to an electronic, magnetic, optical, electromagnetic, infrared, or semiconductor system, an apparatus, or a device, or any suitable combination thereof. For more detailed examples, the computer-readable storage medium includes an electrical connection with one or more wires, a portable computer disk, a hard disk, a RAM, a ROM, an EPROM or flash memory, an optical storage device, a magnetic storage device, or any suitable combination thereof.

In addition, although the operations of the methods disclosed in the present disclosure are described in a particular order in the accompanying drawings, this does not require or imply that these operations need to be performed in the particular order or that all of the shown operations need to be performed to achieve a desired result. On the contrary, execution orders of the steps depicted in the flowcharts may change. Additionally, or optionally, some steps may be omitted, a plurality of steps may be combined into one step for execution, and/or one step may be decomposed into a plurality of steps for execution. It should further be noted that features and functions of two or more apparatuses may be specified in one apparatus according to the present disclosure. On the contrary, features and functions of one apparatus described above may be further divided into a plurality of apparatuses for materialization.

The implementations of the present disclosure are described above. The foregoing descriptions are examples, are not exhaustive, and are not limited to the disclosed implementations. Many modifications and variations are apparent to a person of ordinary skill in the art without departing from the scope and spirit of the described implementations. Selection of terms used in this specification is intended to well explain implementation principles, actual application, or improvements to technologies in the market, or to enable another person of ordinary skill in the art to understand the implementations disclosed in this specification.

What is claimed is:

1. A method implemented by an access point device, wherein the method comprises:

obtaining a transmission opportunity (TXOP) in a wireless local area network (WLAN);

allocating a first period in the TXOP to a non-access point device for data transmission;

receiving a first frame in the first period, wherein an access address of the first frame or a transmitter address (TA) of the first frame is associated with the non-access point device, and wherein the first frame triggers the access point device to update a first network allocation vector (NAV); and when at least one of a plurality of predetermined conditions is not met, maintaining a first network allocation vector (NAV) unchanged in the first period or a remaining time of the TXOP shared with the non-access point device, wherein the predetermined conditions are:

a value of a duration field in the first frame is greater than a current value of the first NAV;

a receiver address (RA) of the first frame is not a media access control (MAC) address of the access point device;

the access point device is not a TXOP holder and a physical layer protocol data unit (PPDU) carrying the first frame does not include a frame requesting an immediate response from the access point device; and the access point device is not the TXOP holder, the first frame is a trigger frame, and neither the RA nor the TA of the first frame is a MAC address of the non-access point device.

2. The method of claim 1, further comprising maintaining a single NAV comprising the first NAV.

3. The method of claim 1, wherein the predetermined conditions further comprise the PDDU has a received energy that is greater than or equal to a specific threshold before a transmit NAV (TXNAV) expires, and wherein the access address or the TA is a MAC address of the non-access point device.

4. The method of claim 1, further comprising sending a multi-user request to send (MU-RTS) TXOP sharing (TXS) trigger frame (TF) to the non-access point device.

5. The method of claim 1, further comprising:

sending a request to send (RTS) frame to at least one receiving device before sending the data;

receiving a clear to send (CTS) frame from the at least one receiving device in response to the RTS frame; and sending the data to the at least one receiving device in response to the CTS frame.

6. The method of claim 1, further comprising:

maintaining two NAVs comprising the first NAV, wherein the first NAV is an intra-basic service set (intra-BSS) NAV; and updating the intra-BSS NAV based on conditions being met, wherein the conditions comprise:

the first frame is an intra-BSS frame;

a first duration that is for the data transmission and that is comprised in the first frame is greater than a second duration indicated by the intra-BSS NAV;

the RA is not a media access control (MAC) address of the access point device; and the access address or the TA is not associated with the non-access point device.

7. The method of claim 1, further comprising:

maintaining two NAVs comprising the first NAV, wherein the first NAV is a basic NAV; and updating the basic NAV based on conditions being met, wherein the conditions comprise:

the first frame is an inter-basic service set (inter-BSS) frame or is not identified by any one of an inter-BSS or an intra-basic service set (intra-BSS);

a first duration that is for the data transmission and that is comprised in the first frame is greater than a second duration indicated by the basic NAV;

the RA is not a media access control (MAC) address of the access point device; and the access address or the TA is not associated with the non-access point device.

8. The method of claim 1, wherein maintaining the first NAV comprises:

determining received energy of a physical layer protocol data unit (PPDU) used to carry the first frame; and maintaining the first NAV based on the received energy not exceeding a pre-determined energy threshold.

9. The method of claim 1, wherein the access point device is an Extremely High Throughput (EHT) access point.

10. An access point device comprising:

a memory configured to store instructions; and one or more processors coupled to the memory and configured to execute the instructions to cause the access point device to:

obtain a transmission opportunity (TXOP) in a wireless local area network (WLAN);

allocate a first period in the TXOP to a non-access point device for data transmission;

receive a first frame in the first period, wherein an access address of the first frame or a transmitter address (TA) of the first frame is associated with the non-access point device;

maintain a first network allocation vector (NAV) based on the first frame;

update the first NAV based on the first frame; and when a transmit NAV (TXNAV) timer is not equal to zero, consider the first NAV to be zero and determine that a channel is idle.

11. The access point device of claim 10, wherein the one or more processors are further configured to execute the instructions to cause the access point device to maintain a single NAV comprising the first NAV.

12. The access point device of claim 10, wherein the instructions further cause the access point device to receive a single user (SU) physical layer protocol data unit (PDDU), wherein a TA of the SU PDDU is associated with the non-access point device, and wherein the access address or the TA is a media access control (MAC) address of the non-access point device.

13. The access point device of claim 10, wherein the one or more processors are further configured to execute the instructions to cause the access point device to send a multi-user request to send (MU-RTS) TXOP sharing (TXS) trigger frame (TF) to the non-access point device.

14. The access point device of claim 10, wherein the one or more processors are further configured to execute the instructions to cause the access point device to:

send a request to send (RTS) frame to at least one receiving device before sending the data;

receive a clear to send (CTS) frame from the at least one receiving device in response to the RTS frame; and send the data to the at least one receiving device in response to the CTS frame.

15. An access point device comprising:

a memory configured to store instructions; and one or more processors coupled to the memory and configured to execute the instructions to cause the access point device to:

obtain a transmission opportunity (TXOP) in a wireless local area network (WLAN);

allocate a first period in the TXOP to a non-access point device for data transmission;

receive a first frame in the first period; and update a first network allocation vector (NAV) when conditions are met, wherein the conditions comprise:

a first duration that is for the data transmission and that is comprised in the first frame is greater than a second duration indicated by the first NAV;

a receiver address of the first frame is not a first media access control (MAC) address of the access point device; and an access address of the first frame or a transmitter address of the first frame is not a second MAC address of the non-access point device.

16. The access point device of claim 15, wherein the first NAV is at least one of an intra-basic service set (intra-BSS) NAV or a basic NAV.

17. The access point device of claim 15, wherein the conditions further comprise that the first frame is an intra-basic service set (intra-BSS) frame, and wherein the one or more processors are further configured to execute the instructions to cause the access point device to update an intra-BSS NAV.

18. The access point device of claim 15, wherein the conditions further comprise that the first frame is an inter-basic service set (inter-BSS) frame or is not identified by any one of an inter-BSS or an intra-basic service set (intra-BSS), and wherein the one or more processors are further configured to execute the instructions to cause the access point device to update a basic NAV.

19. The access point device of claim 15, wherein the one or more processors are further configured to execute the instructions to cause the access point device to maintain a single NAV comprising the first NAV.

20. The access point device of claim 15, wherein the one or more processors are further configured to execute the instructions to cause the access point device to:

send a request to send (RTS) frame to at least one receiving device before sending the data;

receive a clear to send (CTS) frame from the at least one receiving device in response to the RTS frame; and send the data to the at least one receiving device in response to the CTS frame.

* * * * *